United States Patent [19]

Yajima et al.

[11] Patent Number: 4,894,635

[45] Date of Patent: Jan. 16, 1990

[54] STRAIN SENSOR

[75] Inventors: Yasuhita Yajima; Kaszuyoshi Shitaba, both of Nagoya; Syunzo Mase, Aichi, all of Japan

[73] Assignee: NGK Insulators, Ltd., Nagoya, Japan

[21] Appl. No.: 198,085

[22] Filed: May 24, 1988

[30] Foreign Application Priority Data

May 27, 1987 [JP] Japan .................. 62-130878

[51] Int. Cl.⁴ .............................................. G01L 1/22
[52] U.S. Cl. ............................................ 338/2; 338/4; 338/307; 264/61
[58] Field of Search .................. 338/306, 307, 308; 73/862.64, 862.65, 725, 726, 727; 264/61

[56] References Cited

U.S. PATENT DOCUMENTS

| | | | |
|---|---|---|---|
| 4,071,838 | 1/1978 | Block | 338/5 X |
| 4,311,980 | 1/1982 | Prudenziati | 338/4 |
| 4,462,018 | 7/1984 | Yang et al. | 338/3 |
| 4,511,877 | 4/1985 | Nishikawa et al. | 338/2 |
| 4,522,067 | 6/1985 | Burger et al. | 338/3 X |
| 4,695,504 | 9/1987 | Wantanabe et al. | 338/308 |
| 4,771,639 | 9/1988 | Saigusa et al. | 338/4 X |

OTHER PUBLICATIONS

SAE, "Characteristics and Performances of Thick Film Pressure Sensors for Automotive Applications", Society of Automotive Engineers, Inc., Paper No. 820319, pp. 69–75.

SAE, "Low Cost Thick-Film Pressure Sensor", Soc. of Automotive Engineers, Inc., Paper No. 800023, pp. 49–54.

SAE, "High Pressure Thick Film Monolithic Sensors", Paper No. 860474, pp. 79–87.

Primary Examiner—B. A. Reynolds
Assistant Examiner—M. M. Lateef
Attorney, Agent, or Firm—Arnold, White & Durkee

[57] ABSTRACT

A strain sensor including a ceramic substrate deformable in response to a stress exerted thereon, and an electrically resistive layer formed on the ceramic substrate, so that a strain of the ceramic substrate caused by the stress is detected as a change in a resistance value of the electrically resistive layer. The electrically resistive layer has a composition which includes a dielectric material selected from the group consisting of glasses and ceramics, and at least one principal electrically conductive component in the form of a powder selected from the group consisting of: borides, carbides and nitrides of Ti, Zr, Hf, V, Nb, Ta, Cr, Mo and W; borides of Y, Sc and lanthanide series; BN; $B_4C$; BSi; SiC; and $Si_3N_4$.

6 Claims, 5 Drawing Sheets

STRAIN SENSOR

BACKGROUND OF THE INVENTION

Field of the Invention

The present invention relates generally to a ceramic strain sensor, and more particularly to such a ceramic strain sensor having a ceramic substrate which is deformed in response to a stress exerted thereon, and an array of resistors whose resistance value varies depending upon a magnitude of deformation of the ceramic substrate, whereby the magnitude of deformation or strain and the corresponding stress are detected or determined.

Discussion of the Prior Art

There is known a strain sensor or detector of a type wherein resistors connected in a bridge circuit are formed on a deformable substrate such as a diaphragm, which is deformed by a stress such as a pressure applied thereto. Deformation of the diaphragm results in a certain degree of strain of the resistors, thereby causing a loss of balance of the bridge of the resistors in relation to the magnitude of deformation of the substrate and the stress exerted thereto. According to this principle, the strain sensor is capable of measuring the magnitude of a strain or a stress which causes the strain. As a strain sensor of this type, there has been recently proposed a ceramic strain sensor which utilizes properties of a ceramic material, such as high heat resistance, which permits the sensor to operate at an elevated temperature.

An example of a pressure sensing device using such a ceramic strain sensor is disclosed in U.S. Pat. No. 4,311,980 (corresponding to Publication No. 62-12458 of examined Japanese Patent Application). In this pressure sensing device, the strain sensor includes a ceramic substrate which is deformable due to a pressure applied thereto, and a plurality of thick-film resistors formed on the ceramic substrate by a screen printing technique. The strain sensor incorporates an electric circuit adapted to detect a change in the resistance values of the resistors, which varies as a function of the deformation or strain of the ceramic substrate.

In the pressure sensing device including the known strain sensor of the type indicated above, the resistors formed on the ceramic substrate consist of a base formed of a dielectric material such as borosilicate, aluminosilicate, lead borosilicate and lead silicate, and at least one electrically conductive component as a principal conductive material or materials, which is selected from the group consisting of $RuO_2$, $IrO_2$, $TlO_2$, $Bi_2Ru_2O_7$, Au, Pt, Pd, and alloys containing at least one of these compounds. Since the resistors of the above composition are formed by firing at a temperature in the neighborhood of 800° C., the resistors are damaged or deteriorated and become incapable of normally functioning, when exposed to several hundreds of degrees centigrade. For this reason, the upper limit of the temperature at which the sensor can normally function is limited to about 200° C.

Thus, the pressure sensing device disclosed in the above-identified publication is not satisfactory in its heat resistance, and therefore suffers when the device is used to detect a pressure at a pressure source in high temperature environments, for example, a pressure in an engine of an automotive vehicle. Namely, a fluid having the pressure to be detected should be directed from the pressure source to a suitable detecting location at which the temperature of the fluid is sufficiently lowered. In this case, a passage for directing the fluid to the detecting location tends to be plugged by combustion products produced by the engine, such as carbons, and the measurement of the pressure becomes difficult.

On the other hand, the ceramic substrate and the thick-film resistors formed on the substrate cannot be co-fired, in the strain sensor discussed above. Accordingly, the process of producing the strain sensor requires that an appropriate unfired composition for the thick-film resistors be applied by printing to the fired ceramic substrate, and the unfired resistor material be subsequently fired. These process steps are time-consuming, and the strain sensor arrangement produced by the process is practically limited in construction.

SUMMARY OF THE INVENTION

It is therefore an object of the present invention to provide a strain sensor which is operable at higher temperatures than the known sensors.

Another object of the invention is to provide such a strain sensor which is economical to manufacture.

The above objects may be attained according to the principle of the present invention, which provides a strain sensor including a ceramic substrate deformable in response to a stress exerted thereon, and an electrically resistive layer formed on the ceramic substrate, a strain of the ceramic substrate caused by the stress being detected as a change in a resistance value of the electrically resistive layer, wherein the electrically resistive layer has a composition which includes a dielectric material selected from the group consisting of glasses and ceramics, and at least one principal electrically conductive component in the form of a powder selected from the group consisting of: borides, carbides and nitrides and silicates of Ti, Zr, Hf, V, Nb, Ta, Cr, Mo and W; borides of Y, Sc and lanthanide series; BN; $B_4C$; BSi; SiC; and $Si_3N_4$.

In the strain sensor of the present invention described above, the electrically resisitive layer formed on the ceramic substrate deformable with a stress applied thereto consists substantially of a principal electrically conductive component or components which exhibits an excellent physical characteristic at comparatively elevated operating temperatures, and a suitable dielectric material such as a glass or a ceramic material. Unlike the known strain sensor having a resistive layer which employs an electrical conductive material such as $RuO_2$, the instant strain sensor is capable of accurately detecting a strain in comparatively high temperature environments, for example, at a temperature of several hundreds of degrees centigrade. In particular, the instant strain sensor can be utilized as a pressure sensor for detecting or determining a pressure associated with an engine of motor vehicles. Stated more specifically, the pressure sensor according to the invention substantially eliminates the conventionally encountered problem that a fluid passage to which the sensor is exposed for pressure sensing is clogged or plugged by combustion products of the engine as discussed above.

Further, the ceramic substrate and the electrically resistive layer may be formed by co-firing corresponding unfired ceramic and resistive members. This co-firing makes it possible to reduce the overall size of the sensor, and the required number of process steps, leading to an increase in the production efficiency of the sensor, and a decrease in the cost of production. Moreover, the co-firing of the ceramic substrate and the resistive layer allows the strain sensor to have a structural arrangement which cannot be realized or is difficult to realize in the conventional sensor.

In one preferred form of the strain sensor of the present invention, the ceramic substrate comprises a diaphragm, and a base secured to a periphery of the diaphragm for supporting the diaphragm.

In another preferred form of the instant sensor, the composition of the electrically resistive layer is applied by a screen printing technique in the form of a printing ink to a surface of the ceramic substrate, and the applied print ink is fired into the electrically resistive layer. In this case, the composition of the resistive layer may be applied in an unfired state to a surface of a fired body of the ceramic substrate, so that the applied unfired composition is fired into the resistive layer. Alternatively, the composition of the electrically resisive layer in an unfired state may be applied to the surface of an unfired body of the ceramic substrate, so that the applied unfired composition and the unfired body are co-fired.

According to a further preferred form of the instant strain sensor, the resistive layer includes a boride or borides contained as at least one principal electrically conductive component in the dielectric material. Borides have a comparatively high affinity to the dielectric material, and give an excellent ceramic layer with improved durability and reduced fluctuation of physical properties, by firing of the unfired composition of the resistive layer.

According to a still further preferred form of the instant strain sensor, the ceramic substrate includes a ceramic diaphragm portion, and the electrically resistive layer is formed on a portion of at least one of opposite major surfaces of said ceramic substrate which has a higher degree of strain sensitivity to the stress applied, than other portion.

BRIEF DESCRIPTION OF THE DRAWINGS

The foregoing and optional objects, features and advantages of the present invention will be better understood by reading the following detailed description of some presently preferred embodiments of the invention, when considered in connection with the accompanying drawings, in which:

FIGS. 1-3 are views showing different embodiments of a strain sensor of the present invention, FIGS. 1(a), 2(a) and 3(a) being perspective views showing circuit patterns to be formed on a ceramic substrate, FIGS. 1(b) and 2(b) being perspective views illustrating pattern members obtained according to the respective embodiments, and FIGS. 1(c), 2(c) and 3(b) being elevational views in cross section of fired bodies obtained by firing the pattern members;

DETAILED DESCRIPTION OF THE PREFERRED EMBODIMENTS

Figure 1A:
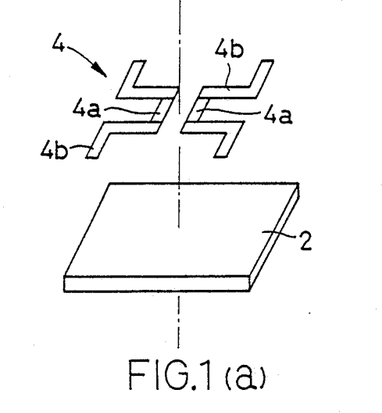
Figure 1B:
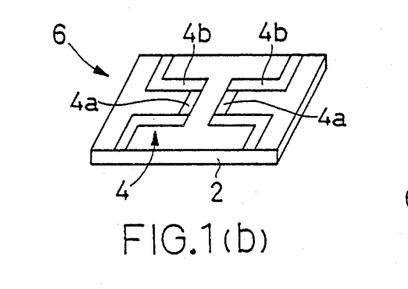
Figure 1C:
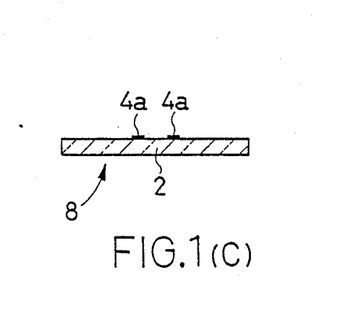

Referring first to FIGS. 1(a), 1(b) and 1(c), the first embodiment of the strain sensor of the invention is prepared from a fired or unfired ceramic substrate 2, and an unfired circuit pattern generally indicated at 4 in FIGS. 1(a) and 1(b). The unfired circuit pattern 4 is formed on the fired or unfired ceramic substrate 2 as indicated in FIG. 1(b), whereby a pattern member 6 is obtained. By firing the circuit pattern 4, a fired body of the instant strain sensor is prepared as indicated in FIG. 1(c).

The fired or unfired ceramic substrate 2 is formed of a suitable ceramic material. After the substrate 2 is fired, the substrate 2 of the fired body 8 is deformable in response to a stress exerted thereon. On this ceramic substrate 2, the unfired circuit pattern 4 as indicated in FIG. 1(a) is formed by a commonly used method, for example, by a screen printing technique, whereby the pattern member 6 as indicated in FIG. 1(b) is prepared.

The ceramic material for the ceramic substrate 2 may be selected from known ceramic materials such as alumina, zirconia and mullite, which are conventionally used for known ceramic strain sensors. By using the selected ceramic materials, the unfired ceramic substrate 2 is formed in planar or thick-film sheets, by a known method. Usually, the selected ceramic material is used in the form of a powder which contains a binder and a plasticizer for increasing the formability of the material. Further, the ceramic powder includes other suitable agents such as a sintering aid.

The unfired circuit pattern 4 thus formed on the surface of the fired or unfired ceramic substrate 2 consists of electrically resistive portions 4a, and electrically conductive portions 4b connected to the electrically resistive portions 4a. The electrically resistive portions 4a are thick films which include a specific principal electrically conductive component or components, which are contained in a suitable dielectric material. The electrically conductive portions 4b are made of an ordinary electrically conductive material.

Described more specifically, each electrically resisitive portion 4a in the form of a thick-film layer substantially consists of a dielectric material such as a glass or ceramic material, and a powder which includes, as a principal electrically conductive component or components, at least one material selected from the group which consists of: borides, carbides, nitrides and silicides of Ti, Zr, Hf, V, Nb, Ta, Cr, Mo and W; borides of Y, Sc and lanthanide series (La, Ce, Pr, Nd, Pm, Sm, Eu, Gd, Tb, Dy, Ho, Er, Tm, Yb and Lu); BN; $B_4C$; BSi; SiC; and $Si_3N_4$. The electrically resistive portions 4a are connected to an external instrument or device, through the electrically conductive portions 4b made of an ordinary conductive material such as a metal, which provides substantially no change in its electrical resistance due to deformation or strain of the ceramic substrate 2.

The dielectric material for the electrically resistive portions 4a is selected from known glass materials, such as borosilicate, lead borosilicate, aluminosilicate, lead silicate, a mixture of these silicates and a suitable oxide, or ceramic materials as used for the ceramic substrate 2, such as alumina, zirconia and mullite.

A powder of the selected dielectric material and a powder of the selected principal electrically conductive component or compound are intimately mixed, and the obtained powder mixture is applied by an ordinary method to the ceramic substrate 2, to form a pattern of the electrically resistive portions 4a, together with the electrically conductive portions 4b. Preferably, the obtained mixture is applied in the form of an ink suitable for printing on the ceramic substrate 2, as generally used for printing. In this case, the pattern of the electrically resistive portions 4a is formed by screen printing using the prepared ink. In this manner, the desired pattern member 6 is prepared.

The unfired circuit pattern 4 thus formed on the pattern member 6 is then fired to produce the fired body 8, i.e., the strain sensor body, as indicated in FIG. 1(c). Since the powder of the specific electrically conductive component or compound as described above is used as the principal electrically conductive component or components of the electrically resistive portions 4a, the unfired circuit pattern 4 can be fired at a temperature of 1000° C. or higher. Therefore, it is possible to co-fire the unfired circuit pattern 4, together with the unfired ceramic substrate 2.

In the thus prepared fired body 8 of the strain sensor, the electrically resistive portions 4a formed on one surface of the ceramic substrate 2 substantially consist of the specifically selected, highly heat-resistant electrically conductive material (as the principal or major electrically conductive material), and the dielectric material which may be a glass or a ceramic. Accordingly, the electrically resisitive portions 4a of the fired body 8 will not be deteriorated or damaged at a relatively high operating temperature, for example, 600°–700° C. In other words, the strain sensor can be exposed to a comparatively high temperature as indicated above. Where the instant strain sensor is used as a ceramic pressure sensor for an automotive engine, the pressure sensor may be located at a high-temperature location of the engine, and is therefore free from the conventionally experienced problem that a pressure fluid passage between the pressure source and the location of the sensor is clogged or plugged by carbons or soot or other combustion products of the engine.

Further, since the co-firing of the unfired circuit pattern 4 and the unfired ceramic substrate 2 is made possible according to the present embodiment, the overall size and the number of the production process steps of the strain sensor can be reduced, whereby the production efficiency is improved, and the production cost is lowered. Moreover, the instant strain sensor may have a structural arrangement which has been considered impossible or difficult. For instance, the strain sensor may have arrangements as illustrated in FIGS. 2 and 3.

Figure 2A:
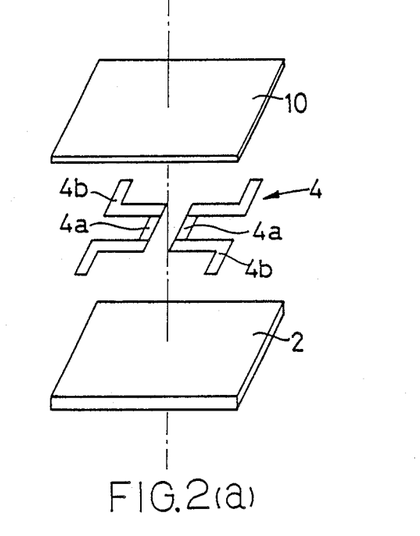
Figure 2B:
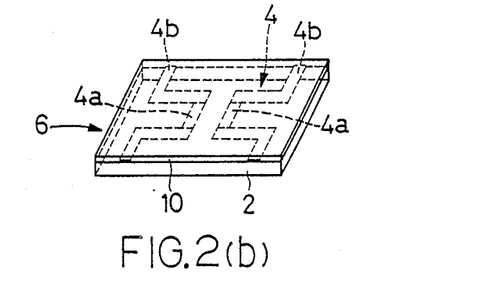
Figure 2C:
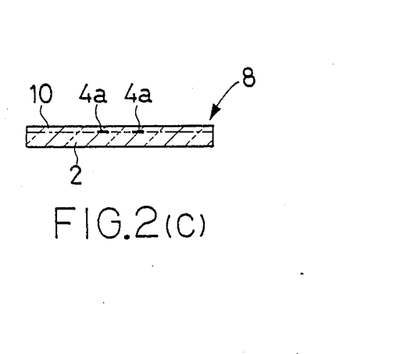

A second embodiment of FIGS. 2(a), 2(b) and 2(c) includes a ceramic protective layer 10 integrally formed to protect the electrically resistive portions 4a (electrically resistive layers). In the instant arrangement, the ceramic protective layer 10 is formed with a suitable thickness on the prepared circuit pattern 4 on the ceramic substrate 2, by printing or deposition method, as indicated in FIG. 2(a), whereby the pattern member 6 having an integral laminar structure is obtained, as shown in FIG. 2(b). Then, the constituents of the unfired laminar structure of the pattern member 6 are co-fired into the fired body 8 as shown in FIG. 2(c), wherein the ceramic protective layer 10 covering and thereby protecting the electrically resistive portions 4a (circuit pattern 4) is physically integrated with the ceramic substrate 2.

For assuring a sufficient degree of adhesion of the ceramic protective layer 10 to the ceramic substrate 2, the protective layer 10 is formed of a ceramic material similar to that of the ceramic substrate 2. These ceramic materials have a relatively high firing or sintering temperature. Hence, if the resistive portions 4a are formed of a dielectric material containing a conventionally used electrically conductive component such as $RuO_2$ which has a relatively low heat resistance, the ceramic protective layer 10 formed on the ceramic substrate 2 of the instant embodiment cannot be provided. The, provision of the protective layer 10 is effectively conductive to an improvement in the durability of the electrically resistive portions 4a.

Figures 3A, 3B:
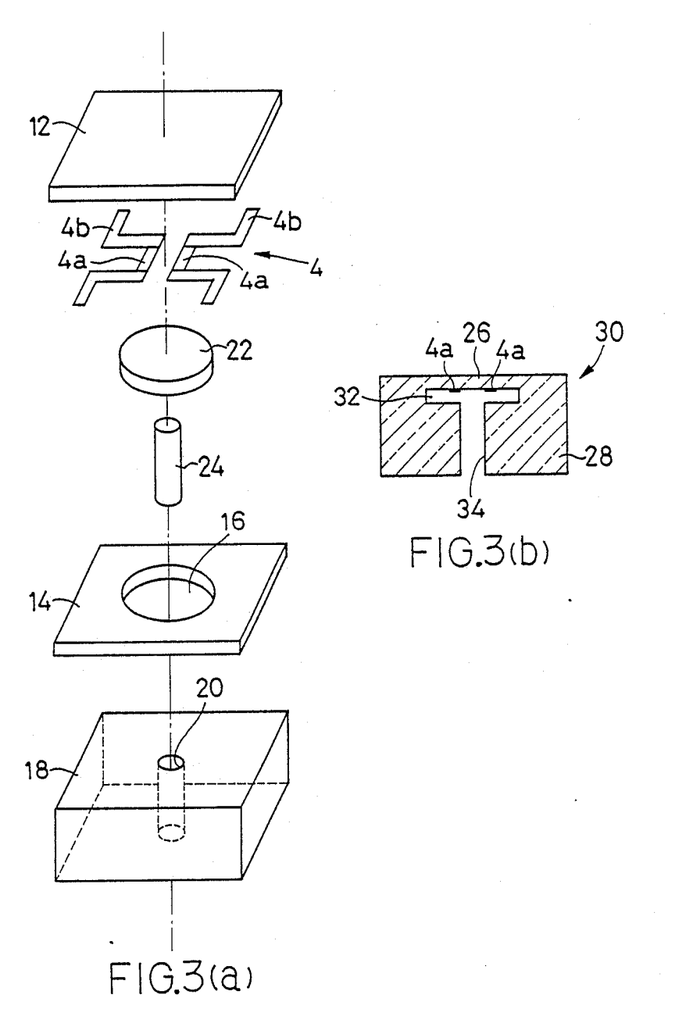

Referring next to FIGS. 3(a) and 3(b), there is illustrated an example of an arrangement of a pressure sensor as one type of the strain sensor according to the present invention. Reference numeral 12 in FIG. 3(a) designates an unfired formed planar or thick-film diaphragm member which gives, by firing thereof, a diaphragm which is deformable in response to a pressure applied thereto, and reference numeral 14 designates an unfired formed planar spacer member which has a circular opening 16 in a central portion thereof. Reference numeral 18 indicates an unfired formed planar or cubic base member having a central through hole 20 through which the circular opening 16 formed in the unfired spacer member 14 communicates with an ambient atmosphere.

When the unfired diaphragm member 12, spacer member 14 and base member 18 are superposed on each other into an unfired laminar body, the circuit pattern 4 described above is formed on the inner surface of the diaphragm member 12 on the side of the spacer member 14. Further, the circular opening 16 in the spacer member 14 is filled with a disk insert 22, which has substantially the same dimensions and shape as those of the opening 16, so that the disk insert 22 is snugly fitted in the opening 16. The disk insert 22 is formed principally of a sublimable material. Similarly, the through hole 20 in the base member 18 is filled with a rod insert 24, which has substantially the same dimensions and shape as those of the hole 20, so that the rod insert 24 is snugly fitted in the hole 20. The rod insert 22 is also formed principally of a sublimable material. The thus prepared unfired laminar body is fired at a suitable sintering temperature into a co-fired integral body 30 as indicated in FIG. 3(b). That is, the unfired diaphragm, spacer and base members 12, 14 and 18 are co-fired into the co-fired body 30, which consists of a diaphragm portion 26 deformable according to a pressure applied thereto, and a base portion 28 which is integral with the diaphragm portion 26 and which is secured to the periphery of the diaphragm portion 26 for supporting the same.

During the firing of the unfired laminar body, the disk insert 22 and the rod insert 24 disappear due to sublimation. As a result, the fired body 30 is formed with an internal cavity 32 having a cylindrical volume corresponding to the disk insert 22, and a communication passage 34 through which the cavity 32 communicates with an external atmosphere.

The pressure sensor using the thus produced co-fired body 30 is operated such that a pressure to be measured is applied to one of opposite major surfaces (an inner surface partially defining the cavity 32, and an outer surface opposite to the inner surface) of the diaphragm portion 26, so that the resistance value of the electrically resistive portions 4a vary as a function of the pressure applied to the diaphragm portion 26. Thus, the pressure is detected or determined as a variation in the resistance values of the resisitive portions 4a.

In the instant embodiment, the electrically resistive portions 4a whose resistance values reflect the strain or deformation of the diaphragm portion 26 are formed on the inner surface of the diaphragm portion 26, as indicated in FIG. 3(b). This structural arrangement is not available according to the conventional process in which an electrically resisitive layer or layers are baked on an already fired ceramic substrate. In other words, the arrangement shown in FIG. 3(b) can be realized owing to the aforementioned co-firing of the unfired resistive portions 4a and the other constituent members of the unfired laminar body. Generally, the resisitive portions 4a are formed on a portion of at least one of the opposite major surfaces of the diaphragm portion 26, which has a higher strain sensitivity to a stress or pressure, than the other portions.

While the embodiments of FIGS. 1-3 employ the two electrically resisitive portions 4a, it will be obvious that a strain sensor according to the present invention may employ only one electrically resistive portion, or three or more electrically resistive portions, as needed.

The strain sensor having the electrically resisitive portions 4a consisting of the dielectric material and the specific principal electrically conductive material indicated above may be given a significantly improved gauge factor, which permits the sensor to provide an improved detecting accuracy.

Figure 4:
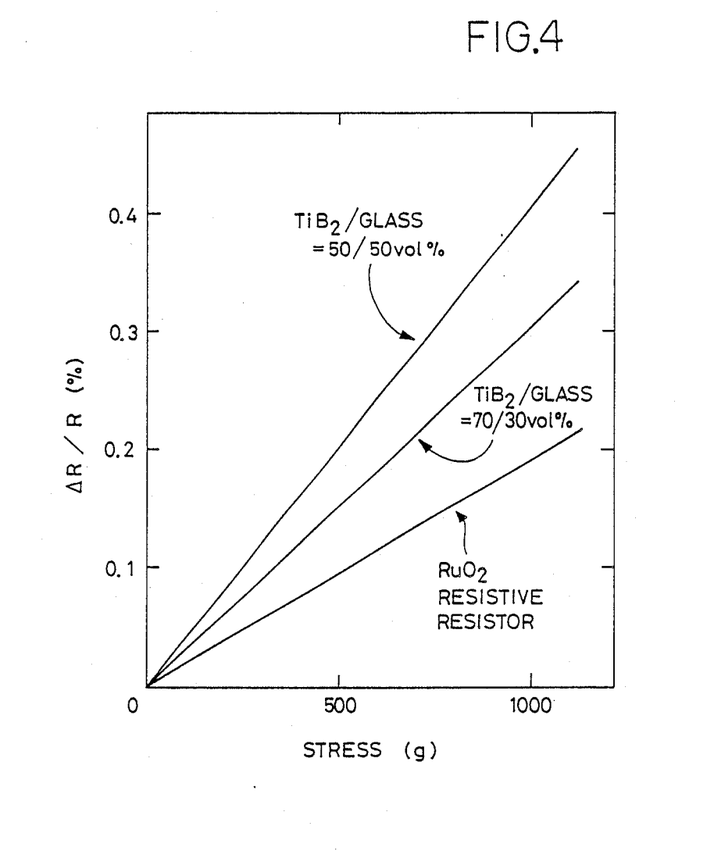
FIG. 4 is a graph showing stress-strain relationships of strain sensors which use different electrically resistive compositions.

The graph of FIG. 4 shows gauge factors of two strain sensors according to the principle of the present invention, and a gauge factor of a comparative strain sensor which has electrically resistive portions containing $RuO_2$. One of the two strain sensors of the invention has electrically resisitive portions which consist of 50% by volume of $TiB_2$ and 50% by volume of a glass, while the other strain sensor of the invention has electrically resisitive portions which consist of 70% by volume of $TiB_2$ and 30% by volume of a glass. The powders of the materials for the resisitive portions of the strain sensors of the invention have an average particle size of 6 microns. The gauge factor is defined as $\Delta R/R$, where R represents an electrical resistance, while $\Delta R$ represents a change in the electrical resistance. It will be understood from the graph that the strain sensors according to the present invention exhibit higher gauge factors with respect to a load or stress applied to the diaphragm portion, than the comparative strain sensor. The gauge factors $\Delta R/R$ were obtained by measuring a change n the electrical resistance values of the resisitive portions formed on a beam portion formed of alumina, when the beam portion is deflected by a three-point bending method.

FIG. 6 illustrates an example of a structural arrangement of a pressure sensor (strain sensor) using the co-fired integral body 30 as shown in FIG. 3(b), wherein the diaphragm and base portions 26, 28 are integral with each other. The co-fired body 30 is accommodated within a housing body 40 and covered by a lid member 42. The three members 30, 40, 42 are maintained in the assembled state by a cauling member 44 which engages the housing body 40 and the lid member 42, so that the peripheral part of the co-fired body 30 is pressed by the lid member 42 against the housing body 40. An 0-ring 46 is interposed between the lower surface of the co-fired body 30 and the opposite inner surface of the housing body 40, in order to provide a sealing or pressure tightness therebetween. The housing body 40 has a pressure hole 48 formed therethrough such that the hole 48 communicates with the communication passage 34 and circular cavity 32 formed in the co-fired body 30. In operation, the pressure sensor is disposed such that the pressure hole 48 is open in a fluid whose pressure is measured. Thus, the pressure of the introduced fluid in the cavity 32 acts on the inner surface of the diaphragm portion 26.

On the outer surface of the diaphragm portion 26 of the co-fired body 30, there are integrally formed four resistors R1, R2, R3 and R4, for example, which are connected in a bridge configuration as known in the art, such as a Wheatstone bridge circuit. With the diaphragm portion 26 deformed by the pressure of the fluid introduced through the pressure hole 48, the resistance values of the resistors R1–R4 decrease or increase, and an output of the bridge circuit is fed to an external device through a lead cable 50 connected to the circuit.

Figures 6A, 6B:
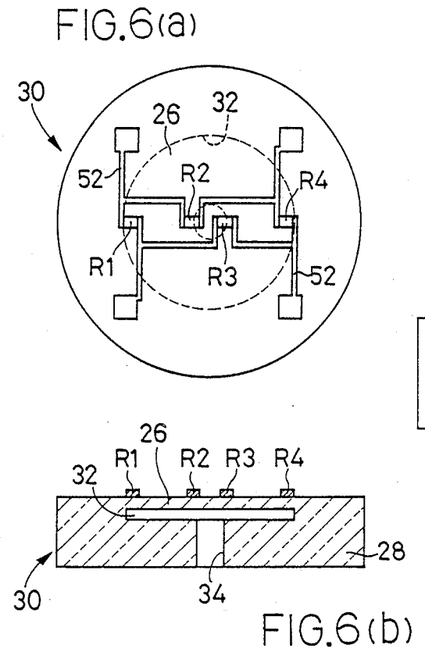
FIGS. 6(a) and 6(b) are plan and elevational cross sectional views of a co-fired ceramic body of the strain sensor of FIG. 5.
Figure 7:
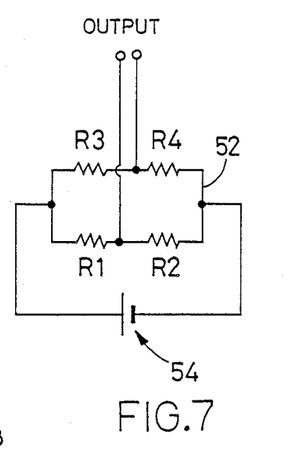
FIG. 7 is a diagram showing an example of a bridge circuit formed on the co-fired ceramic body of FIGS. 6(a) and 6(b)

The arrangement of the four resistors R1–R4 which are thus formed on the diaphragm portion 26 of the co-fired body 30 and connected to each other by conductors 52 are shown in FIGS. 6(a) and 6(b). The bridge circuit constituted by the resistors R1–R4 and conductors 52 may be a known configuration. An example of the bridge circuit is illustrated in FIG. 7. Reference numeral 54 in FIG. 7 indicates a power source.

Figure 8:
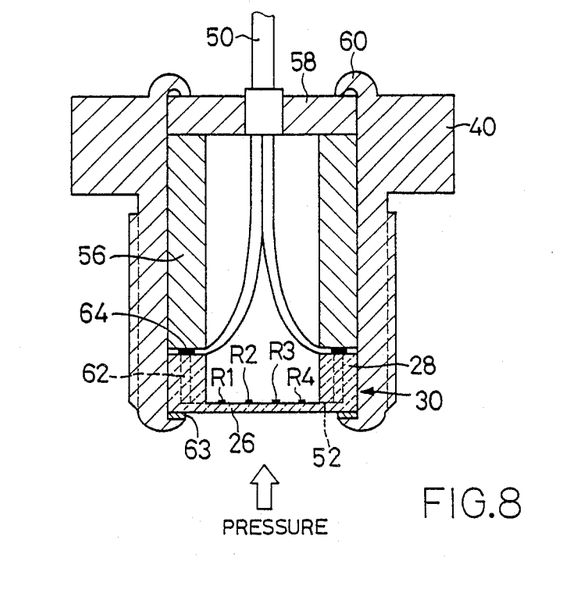
FIG. 8 is an elevational view in cross section, illustrating another exmpale of an arrangement of the pressure sensor according to the invention.
Figure 9:
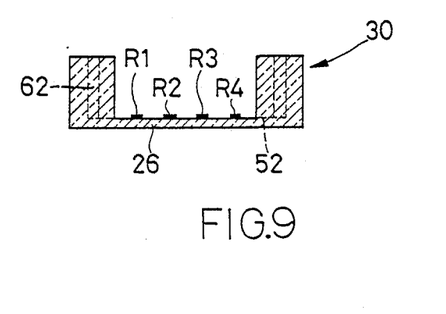
FIG. 9 is an elevational view in cross section of the co-fired ceramic body of the pressure sensor of FIG. 8.

FIG. 8 illustrates another example of a pressure sensor (strain sensor) which uses the cup-shaped cylindrical co-fired integral body 30 having a relative small depth, wherein the diaphragm and base portions 26, 28, resistors R1–R4, and conductors 52, 62 are physically integrated with each other. The conductors 62 are formed within the cylindrical wall of the base portion 28, by a known through-hole printing technique. The co-fired body 30 is accommodated within the housing body 40, together with a retainer 56, a lid member and a washer 63. These members are maintained in the assembled state by a cauling portion 60 of the housing body 40, which engages the co-fired body 30 and the lid member 58. In this embodiment, too, the resistors R1–R4 are connected in a bridge circuit as illustrated in FIG. 6. An output of the bridge circuit is fed to an external device, through the conductors 52, 62, an electrode 64, and the lead cable 50.

Figure 5:
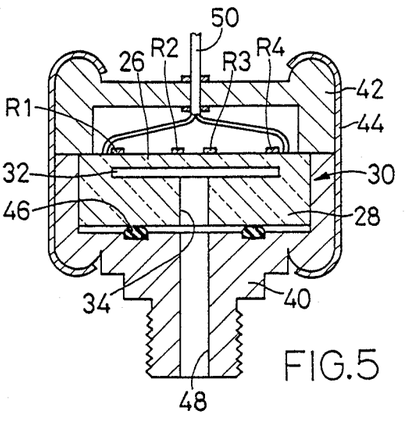
FIG. 5 is an elevational view in cross section, depicting an example of an arrangement of the strain sensor of the invention in the form of a pressure sensor.

In the pressure sensor of FIG. 8, the diaphragm portion 26 is directly exposed to a measurement fluid, and has no pressure hole like the hole 48 provided in the embodiment of FIG. 5. Therefore, where the instant pressure sensor is used to detect a pressure within an automotive engine, the sensor does not suffer from plugging of such a pressure hole by carbons or other combustion products, which causes lowered detecting accuracy of the sensor.

While the present invention has been described in its presently preferred embodiments with a cetain degree of particularity, it is to be understood that the invention is not limited to the details of the illustrated embodiments, but may be embodied with various changes, modifications and improvements, which may occur to those skilled in the art, without departing from the spirit and scope of the invention defined in the appended claims.

What is claimed is:

1. A strain sensor including a ceramic substrate deformable in response to a stress exerted thereon, and an electrically resistive layer formed on the ceramic substrate, a strain of the ceramic substrate caused by the stress being detected as a change in a resistance value of the electrically resistive layer, wherein the improvement comprises:

said electrically resistive layer having a composition which includes a dielectric material selected from the group consisting of glasses and ceramics, and at least one principal electrically conductive component in the form of a powder selected from the group consisting of: borides, carbides and nitrides and silicates of Ti, Zr, Hf, V, Nb, Ta, Cr, Mo and W; borides of Y, Sc and lanthanide series; BN; $B_4C$; SiC; and $Si_3N_4$.

2. A strain sensor according to claim 1, wherein said ceramic substrate comprises a diaphragm, and a base secured to a periphery of said diaphragm for supporting the diaphragm.

3. A strain sensor according to claim 1, wherein said composition of said electrically resistive layer is applied by a screen printing technique in the form of a printing ink to a surface of said ceramic substrate, and the applied print ink is fired into the electrically resistive layer.

4. A strain sensor according to claim 1, wherein said composition of said electrically resistive layer is applied in an unfired state to a surface of a fired body of said ceramic substrate, and the applied unfired composition is fired into the electrically resistive layer.

5. A strain sensor according to claim 1, wherein said composition of said electrically resisitive layer is applied in an unfired state to a surface of an unfired body of said ceramic substrate, and the applied unfired composition and said unfired body are co-fired.

6. A strain sensor according to claim 1, wherein said ceramic substrate includes a ceramic diaphragm portion, and said electrically resistive layer is formed on a portion of at least one of opposite major surfaces of said ceramic substrate which has a higher degree of strain sensitivity to the stress applied, than another portion thereof.

* * * * *